United States Patent [19]

Kimura et al.

[11] Patent Number: 4,825,431
[45] Date of Patent: Apr. 25, 1989

[54] DISC REPRODUCING APPARATUS

[75] Inventors: Shuichi Kimura, Tokyo; Mitsuru Hanajima, Saitama, both of Japan

[73] Assignee: Sony Corporation, Tokyo, Japan

[21] Appl. No.: 939,575

[22] Filed: Dec. 9, 1986

[30] Foreign Application Priority Data

Dec. 20, 1985 [JP] Japan ................................ 60-287549

[51] Int. Cl.⁴ ............................................. G11B 7/00
[52] U.S. Cl. ........................................ 369/50; 369/59
[58] Field of Search ................................... 369/50, 59

[56] References Cited

U.S. PATENT DOCUMENTS

| 4,321,635 | 3/1982 | Tsuyuguchi | 369/25 |
| 4,370,679 | 1/1933 | Ceshkovsky et al. | 369/48 |
| 4,390,977 | 6/1983 | Onigata et al. | 369/50 |
| 4,397,011 | 8/1983 | Ogawa | 369/50 |
| 4,646,280 | 2/1987 | Toyosawa | 369/50 |

Primary Examiner—Patrick R. Salce
Assistant Examiner—Anita M. Ault
Attorney, Agent, or Firm—Phillip M. Shaw, Jr.

[57] ABSTRACT

A disc reproducing apparatus of the type having information prerecorded in the form of pits or other discrete indicia on tracks on a rotating record wherein the track access time of the information playback transducer can be increased by simultaneously increasing the rotational speed of the record from the speed normally employed during playback of the recorded information and selectively filtering out the pit component at a lower time constant when the record is rotated at such higher speed.

7 Claims, 3 Drawing Sheets

RF OUTPUT

DISC REPRODUCING APPARATUS

FIELD OF THE INVENTION AND RELATED ART STATEMENT

The present invention relates to a disc reproducing apparatus for reproducing signals from a disc on which digital signals were recorded.

In an optical disc (hereinafter, referred to as a compact disc) on which digital audio signals are recorded, when a target reproduction start position is accessed, the number of tracks over which an optical pickup will traverse until the optical pickup reaches the target start position is calculated using the data of a TOC (table of contents) and the optical pickup is moved on the basis of this count value. The disc reproducing apparatus is provided with a track detecting circuit to count the number of tracks over which the optical pickup will traverse and to signal when the optical pickup has arrived at the target track.

FIG. 1 shows an example of such a conventional track detecting circuit. The conventional track detecting circuit detects the number of traverse tracks by use of the reproduced RF signal from the optical pickup. In addition to this circuit to detect the number of traverse tracks using the reproduced RF signal, for example, there is also known a way to detect the number of traverse tracks by using a tracking servo signal as shown in the Official Gazette of Japanese Patent Examined Publication No. 28054/1985.

In FIG. 1, the RF signal is input to a terminal 51. The input terminal 51 is connected to the anodes of diodes 53 and 54 through a capacitor 52. A capacitor 55 and a resistor 56 are connected in parallel between a cathode of the diode 53 and the ground, respectively. A series circuit of resistors 57 and 58 is inserted between the cathode of the diode 53 and the ground. A node of the resistors 57 and 58 is connected to one input terminal of a comparator 59.

A capacitor 60 and a resistor 61 are connected in parallel between a cathode of the diode 54 and the ground, respectively. The cathode of the diode 54 is connected to the other input terminal of the comparator 59. An output terminal 62 is led out of an output terminal of the comparator 59.

The reproduced RF signal is supplied from the optical pickup to the input terminal 51. When the optical pickup is fed at a high speed, e.g., 8 cm/sec, as shown in FIG. 2, track detection outputs corresponding to the traverse of tracks 64 on a disc 63 by the optical pickup appear in the RF signal together with outputs of the pits. The RF signal including the pit outputs and track detection outputs as mentioned above is input to the input terminal 51 and transmitted through the coupling capacitor 52 to the diodes 53 and 54 as the signal from which the DC component is removed as shown in FIG. 3.

The RF signal derived through the capacitor 52 is rectified by the diodes 53, and 54, respectively. A filter consisting of the capacitor 55 and resistor 56 is connected to the diode 53.

The filter consisting of the capacitor 55 and resistor 56 is designed to have a large time constant, so that the output of the diode 53 is averaged. The averaged output is output from the node of the resistors 57 and 58.

The filter composed of the capacitor 60 and resistor 61 is connected to the diode 54 and is designed to have a time constant small enough to remove the frequency components of the pits. Thus, the pit frequency components are removed from the output of the diode 54 and only the track detection output is supplied to the other input of the comparator 59. The track detection output is compared with the average level which is output from the node of the resistors 57 and 58 by the comparator 59. Thus, a pulse corresponding to the traverse over the tracks 64 by the optical pickup is output from the terminal 62.

The digital data is EFM modulated and recorded on the compact disc. In EFM modulation, the inverting interval lies within a range of 3T to 11T (T is a bit period) on the basis of the modulation rule. Since the bit rate of the data is 2.16 MHz/sec, 1T is ($\frac{1}{2.16 \times 2}$ = 237 nsec). Therefore, assuming that the maximum inverting interval 1T is repeated, the bit frequency component becomes $$1/(237 \text{ nsec} \times 11 \times 2) \div 200 \text{ kHz}$$

The interval (track pitch) between the tracks of the respective pits formed on the compact disc is 1.6 μm. In the conventional disc reproducing apparatus, the feed speed of the optical pickup is set to, e.g., 8 cm/sec. Therefore, assuming that the feed speed of the optical pickup is 8 cm/sec, the frequency of the track detection signal becomes 50 kHz.

In the conventional disc reproducing apparatus, the feed speed of the optical pickup is set to, e.g., 8 cm/sec. In the case of this feed speed, an access time for the optical pickup of 0.4 to 0.5 seconds is required to move the optical pickup to the target reproduction start position, and 0.3 seconds is needed to search the target track number, so that a total time of about 0.8 seconds is necessary. If the feed speed of the optical pickup is raised, the access time can be reduced. In particular, for the case where not only digital audio signals but also various kinds of digital data were recorded on the compact disc, there is a strong demand to reduce the access time by increasing the feed speed of the optical pickup.

By using a linear motor as the feed mechanism of the optical pickup, the feed speed of the pickup can be sufficiently increased. However, in the conventional pickup detecting circuit, the problem occurs that the track detection signal cannot be obtained when the feed speed of the pickup is raised.

Namely, as mentioned above, the pit frequency component is 200 kHz. Therefore, if the frequency of the track detection signal is 100 kHz above the frequency of ½ of this pit component, no track can be detected in accordance with the theorem of sampling. When considering the characteristic of the low pass filter, the tracks can in practice be detected when the frequency of the track detection signal is below 50 kHz. The frequency of the track detection signal becomes 50 kHz when the track pitch is 1.6 μm, namely, when the feed speed is 8 cm/sec. In other words, when the feed speed is made faster than 8 cm/sec, the frequency of the track detection signal increases and the tracks cannot be detected.

OBJECT AND THE SUMMARY OF THE INVENTION

It is, therefore, an object of the invention to provide a disc reproducing apparatus which can detect the tracks even when the optical pickup is moved at a high speed.

To accomplish this object, according to a disc reproducing apparatus of the invention, when the optical pickup is fed at a high speed, the disc is rotated at a speed higher than that in the ordinary playback mode, causing the pit frequency component to increase, for example, from 200 kHz to 400 kHz. This increased rotational speed of the disc allows the frequency of the track detection signal to be raised and the data pit components of the RF single are removed by a filter having a selectable time constant.

The foregoing and other objectives, features and advantages of the invention will be more readily understood upon consideration of the following detailed description of certain preferred embodiments of the invention, taken in conjunction with the accompanying drawings.

DETAILED DESCRIPTION OF PREFERRED EMBODIMENTS

An embodiment of the present invention will now be described with reference to the drawings.

Figure 1:
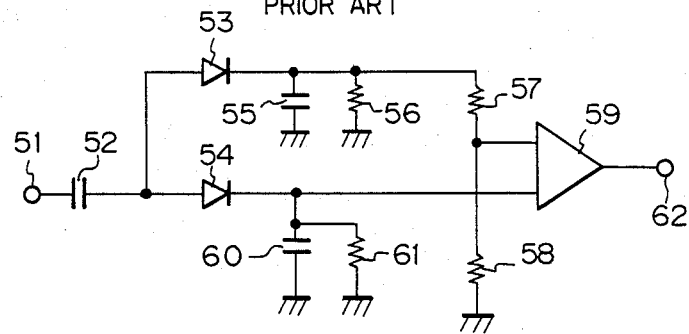
FIG. 1 is a connection diagram of an example of a conventional track, detecting circuit.
Figure 2:
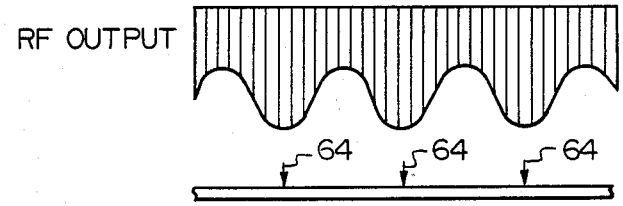
FIGS. 2 and 3 are waveform diagrams which are used to explain an example of a conventional track detecting circuit.
Figure 3:
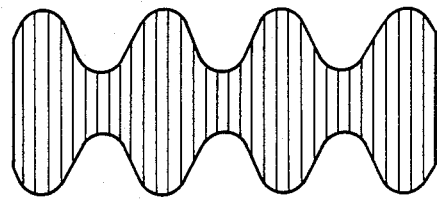
Figure 4:
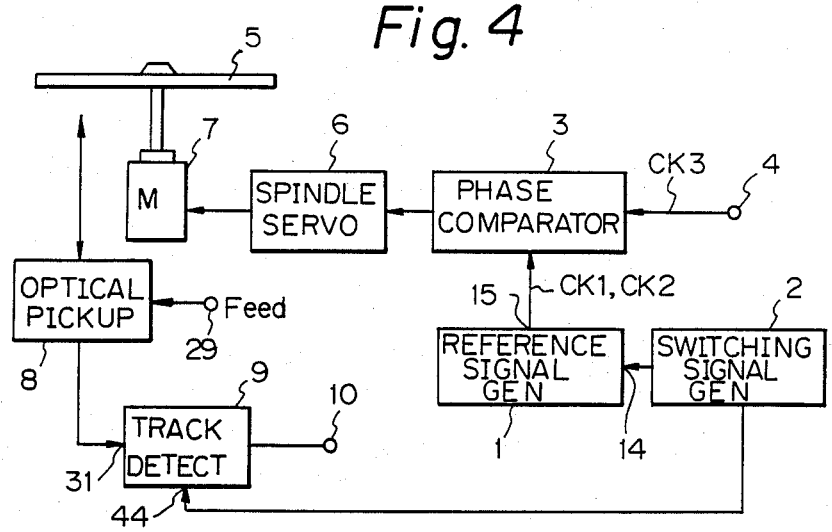
FIG. 4 is a block diagram of an embodiment of the present invention.

In FIG. 4, a reference signal generator 1 generates a reference clock signal $CK_1$ and a reference clock signal $CK_2$ having a frequency which is twice as high as that of the clock signal $CK_1$. Either one of the reference clocks $CK_1$ and $CK_2$ is selectively output from the generator 1 in response to the output of a switching signal generator 2. The switching signal generator is controlled by the disc player controller (not shown) which also controls the feed, i.e. the access movement of the optical pickup 8. In the ordinary playback mode, the reference clock signal $CK_1$ is output. When the reproduction start position is accessed, the reference clock signal $CK_2$ is output.

Figure 5:
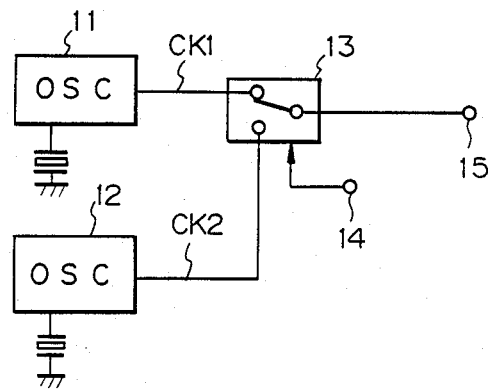
FIG. 5 is a block diagram of an example of a reference signal generator in an embodiment of the invention.

As shown in FIG. 5, the reference signal generator 1 is constituted in a manner such that the output clock signal $CK_1$ of the frequency $f_1$ from an oscillator 11 and the output clock signal $CK_2$ of the frequency $f_2$ from an oscillator 12 are supplied to an electronic switching circuit 13 and either one of the clocks $CK_1$ and $CK_2$ is selectively supplied to an output terminal 15 under the control of the switching signal from the switching signal generator 2 which is supplied to a control terminal 14 of the switch 13.

Figure 6:
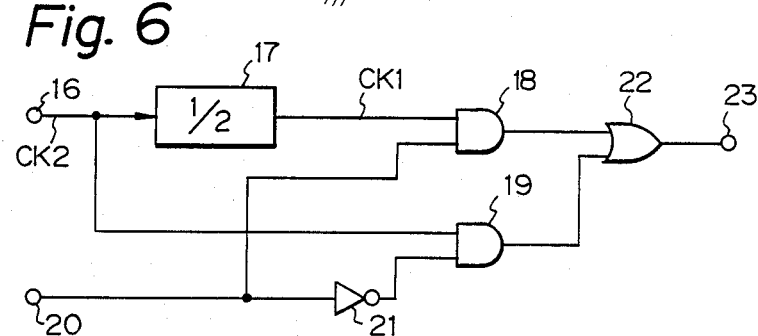
FIG. 6 is a block diagram of another example of a reference signal generator in an embodiment of the invention.

Instead of using two oscillators, the generator 1 may be also constituted in the manner shown in FIG. 6. Namely, the clock signal $CK_2$ of the frequency $f_2$ is supplied to a terminal 16. The clock signal $CK_2$ is frequency divided by a ½ frequency divider 17 to form the clock signal $CK_1$ of the frequency $f_1$. The clocks $CK_1$ and $CK_2$ are selected by AND gates 18 and 19 by the switching signal which is directly supplied to the AND gate 18 from a terminal 20 and also supplied through an invertor 21 to the AND gate 19. The selected one of the clocks $CK_1$ and $CK_2$ is supplied to an output terminal 23 through an OR gate 22.

The reference clock signal $CK_1$ or $CK_2$ which is output from the generator 1 is supplied to a phase comparator 3. A clock signal $CK_3$ is extracted by conventional circuitry (not shown) from the reproduced RF signal of an optical disc 5 and is supplied at a terminal 4 to the comparator 3. The clock signal $CK_3$ from the terminal 4 is phase compared with the reference clock signal $CK_1$ or $CK_2$ by the phase comparator 3 and the resultant difference signal is supplied to a spindle servo circuit 6. A control signal based on the difference signal is formed by the spindle servo circuit 6. A spindle motor 7 is rotated at a constant linear velocity in response to the control signal. For example, the control of the spindle motor is disclosed in U.S. Pat. No. 4,397,011 by the same applicant as the present invention.

The reproduced RF signal of the optical disc 5 from an optical pickup 8 is supplied to a track detecting circuit 9. In the track detecting circuit 9, the time constant of a filter to remove the pit component can be switched by the output of the switching signal generator 2.

Figure 7:
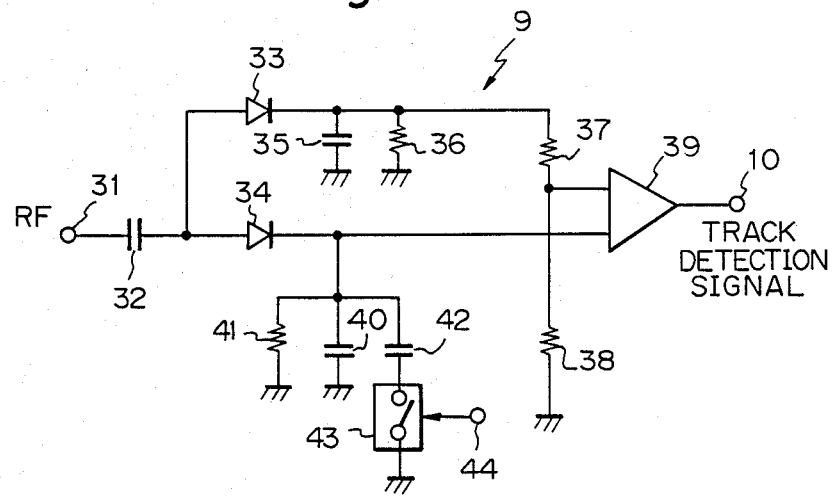
FIG. 7 is a connection diagram of an example of a track detecting circuit in an embodiment of the invention.

Namely, the track detecting circuit 9 is constituted as shown in FIG. 7. The RF signal is input to a terminal 31. The input terminal 31 is connected to the anodes of diodes 33 and 34 through a capacitor 32. A capacitor 35 and a resistor 36 are connected in parallel between a cathode of the diode 33 and the ground. A series circuit of resistors 37 and 38 is inserted between the cathode of the diode 33 and the ground. A node of the resistors 37 and 38 is connected to one input terminal of a comparator 39.

A capacitor 40 and a resistor 41 are connected in parallel between a cathode of the diode 34 and the ground. One end of a capacitor 42 is connected to the cathode of the diode 34. The other end of the capacitor 42 is grounded through a switching circuit 43. The ON/OFF operations of the switching circuit 43 are controlled by a switch control signal from the switching signal generator 2 which is supplied to a terminal 44. The cathode of the diode 34 is connected to the other input terminal of the comparator 39. An output terminal 10 is led out of the comparator 39.

The reproduced RF signal from the optical pickup 8 is supplied to the input terminal 31. The RF signal is supplied through the capacitor 32 and is rectified by the diodes 33 and 34. A filter consisting of the capacitor 35 and resistor 36 is connected to the diode 33. The filter consisting of the capacitor 35 and resistor 36 is designed to have a large time constant, so that the output of the diode 33 is averaged. The averaged output is output from the node of the resistors 37 and 38.

A filter composed of the resistor 41 and capacitors 40 and 42 is connected to the diode 34. This filter removes the pit components from the detected signal. The time constant of this filter is designed to have a large value when the switching circuit 43 is turned on and it is designed to have a small value when the switching circuit 43 is turned off. When the switching circuit 43 is turned on, the time constant is designed to have a value large enough to remove the pit component when the disc 5 is rotated at the rotational speed in the ordinary playback mode. When the switching circuit 43 is turned off, the time constant is designed to have a value small enough to remove the pit component when the disc 5 is rotated at a rotational speed which is twice as high as that in the ordinary playback mode. Thus, the pit component is removed from the output of the diode 34 and only the track detection output is supplied to the input of the comparator 39. The track detection output is compared with the average level which is output from the node of the resistors 37 and 38 by the comparator 39. A pulse corresponding to the traverse of the tracks on the disc 5 by the optical pickup 8 is supplied to the output terminal 10.

Figure 8:
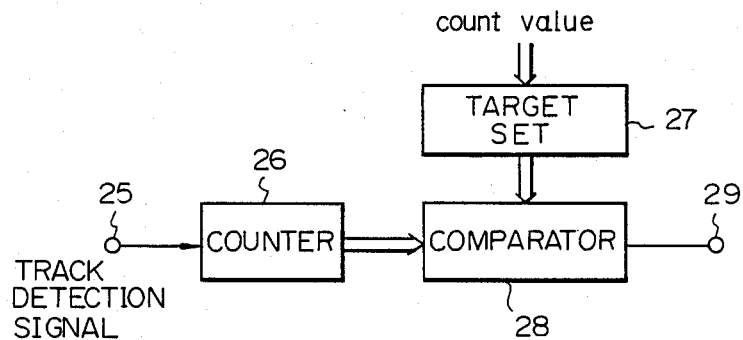
FIG. 8 is a block diagram which is used to explain an embodiment of the invention.

When accessing the target reproduction start position, this track detection signal, as shown in FIG. 8, is supplied from an input terminal 25 to a counter 26. The number of tracks over which the optical pickup 8 has traversed is counted by this counter from the track detection signal. The number of tracks over which the optical pickup 8 will traverse until the target reproduction start position is reached is calculated by a microprocessor (not shown) of the disc reproducing apparatus by use of the data of the TOC. The count value of the number of tracks is set into a target setting circuit 27 to set a desired number of traverse tracks. The track number set in the target setting circuit 27 is compared with the count value of the counter 26 by a comparator 28. When they coincide, a stop feed signal is output from an output terminal 29 to stop the radial movement of the optical pickup 8.

In the ordinary playback mode, the reference clock signal $CK_1$ is supplied from the reference signal generator 1 to the phase comparator 3 in response to the output of the switching signal generator 2. The rotation of the disc 5 is controlled by the clock signal $CK_1$. When the optical pickup 8 is fed at a high speed to access the reproduction start position, however, the reference clock signal $CK_2$, having a frequency which is twice as high as the reference clock signal $CK_1$, is simultaneously supplied to the phase comparator 3 in response to the switching signal generator 2. The rotation of the disc 5 is controlled by the clock signal $CK_2$. Therefore, when the reproduction start position is accessed, the disc 5 is rotated at a rotational speed which is twice as high as that in the ordinary playback mode.

When the rotational speed of the disc 5 is twice as high as that in the ordinary playback mode, the pit frequency component is also double that in the ordinary playback mode. Since the pit frequency component in the ordinary playback mode is about 200 kHz, by setting the rotational speed of the disc 5 to be twice the speed in the ordinary playback mode, the pit frequency component upon access of the reproduction start position becomes about 400 kHz.

When the pit frequency component is 400 kHz, the tracks can be detected if the frequency of the track detection signal is 200 kHz below ½ of the pit frequency component on the basis of the theorem of sampling. When considering the characteristic of the low pass filter as well, the tracks can be detected if the frequency of the track detection signal is below 100 kHz. Therefore, the feed speed of the optical pickup 8 can be set to 16 cm/sec.

As described above, when the optical pickup 8 is fed at a high speed to access the reproduction start position, the disc 5 is simultaneously rotated at a high speed, so that the access feed speed can be raised. But this causes the pit frequency component to also be increased. Therefore, to detect the tracks even in the case of the high pit frequency component, the time constant of the filter to remove the pit frequency component of the track detecting circuit 9 can be switched.

The track detecting circuit 9 is not limited to a construction such that the tracks ar detected only using the reproduced RF signal but may also be constituted so as to detect the tracks using a tracking servo signal.

The invention can also be similarly applied to the optical disc on which a video signal was recorded.

According to the invention, when the optical pickup is fed at a high speed, the rotational speed of the disc is set to be higher than the rotational speed in the ordinary playback mode, so that the pit frequency component rises. To remove the pit component frequency from the detected signal, a filter having a selectable time constant is used. During the period of high feed speed, a shorter time constant is selected for the filter. Therefore, he feed speed can be raised while still allowing track crossings to be detected. For example, when the disc rotational speed in the high speed feeding mode is set to be twice as high as that in the ordinary playback mode, the optical pickup can be fed at, e.g., 16 cm/sec. Consequently, when the reproduction start position is accessed, the moving time of the optical pickup can be reduced to, e.g., 0.2 to 0.3 seconds and the access time can be also decreased to 0.5 to 0.6 seconds.

Although the present invention has been shown and described with respect to a preferred embodiment, various changes and modifications which are obvious to a person skilled in the art to which the invention pertains are deemed to lie within the spirit and scope of the invention.

What is claimed is:

1. An apparatus for reproducing signals recorded on tracks on a disc-shaped record carrier comprising:
    transducer means, including a transducer, for accessing selected tracks on the record carrier and reproducing the signals recorded thereon;
    moving means for moving said transducer in the direction of the radius of the record carrier at a high speed;
    drive means for rotating the record carrier at one speed during playback of the recorded signals and at a second, higher speed during accessing of the selected track by the transducer means at said high speed; and
    wherein the moving means further includes track detecting means for detecting when the transducer has crossed over recording tracks on the record carrier during movement of the transducer, said track detecting means including
    extracting means to which the reproduced signal from the transducer means is supplied and which extracts a signal indicative of the tracks crossed over by the transducer means and
    selective time constant circuit means which has a variable time constant which changes from a first value to a second, lower value when said transducer reads information from said record carrier being rotated at said second speed.

2. An apparatus according to claim 1, wherein the signals reproduced by the transducer means have a pit component frequency and wherein said extracting means comprises means for rectifying the signals reproduced by the transducer means and a first filter for averaging said rectified signals, and said selective time constant circuit means includes a second filter for removing the pit component frequency, said second filter having a time constant which is selectable between a first value when the record carrier is rotated at the playback speed and a second, smaller value when the record carrier is rotated at said second, higher speed.

3. An apparatus according to claim 1, wherein the moving means moves said transducer at a velocity of 16 cm/sec.

4. An apparatus according to claim 1, further comprising means for supplying a track servo signal to said track detecting means.

5. An apparatus according to claim 1, wherein said drive means has a reference clock generator for generating a reference clock signal and further including means for selectively changing the frequency of said reference signals.

6. A method of reproducing signals recorded in circular tracks on a disc comprising the steps of rotating the disc at a first speed, reproducing signals recorded on the disc while it is being rotated at said first speed by means of a transducer positioned over a selected track on said disc, and simultaneously rotating said disc at a second, higher speed, moving the transducer radially across the disc from one track to another, and counting the number of tracks crossed by means of the signals reproduced by the transducer wherein the step of counting the number of tracks crossed includes the steps of:

extracting from the reproduced signal from the transducer a signal indicative of the tracks crossed over by the transducer and filtering the extracted track crossing signal with a filter which has a variable time constant and changing the time constant from a first value to a second, lower value when the transducer reads information from the record carrier being rotated at the second speed.

7. A method of reproducing signals recorded in circular tracks on a disc as recited in claim 6, wherein the transducer is moved across the tracks at a velocity of 16 cm/sec.

* * * * *